Sept. 8, 1959 K. HANSELMANN 2,902,946
POWER TRANSMITTING ARRANGEMENT IN A LOCOMOTIVE
Filed Oct. 25, 1954 4 Sheets-Sheet 1
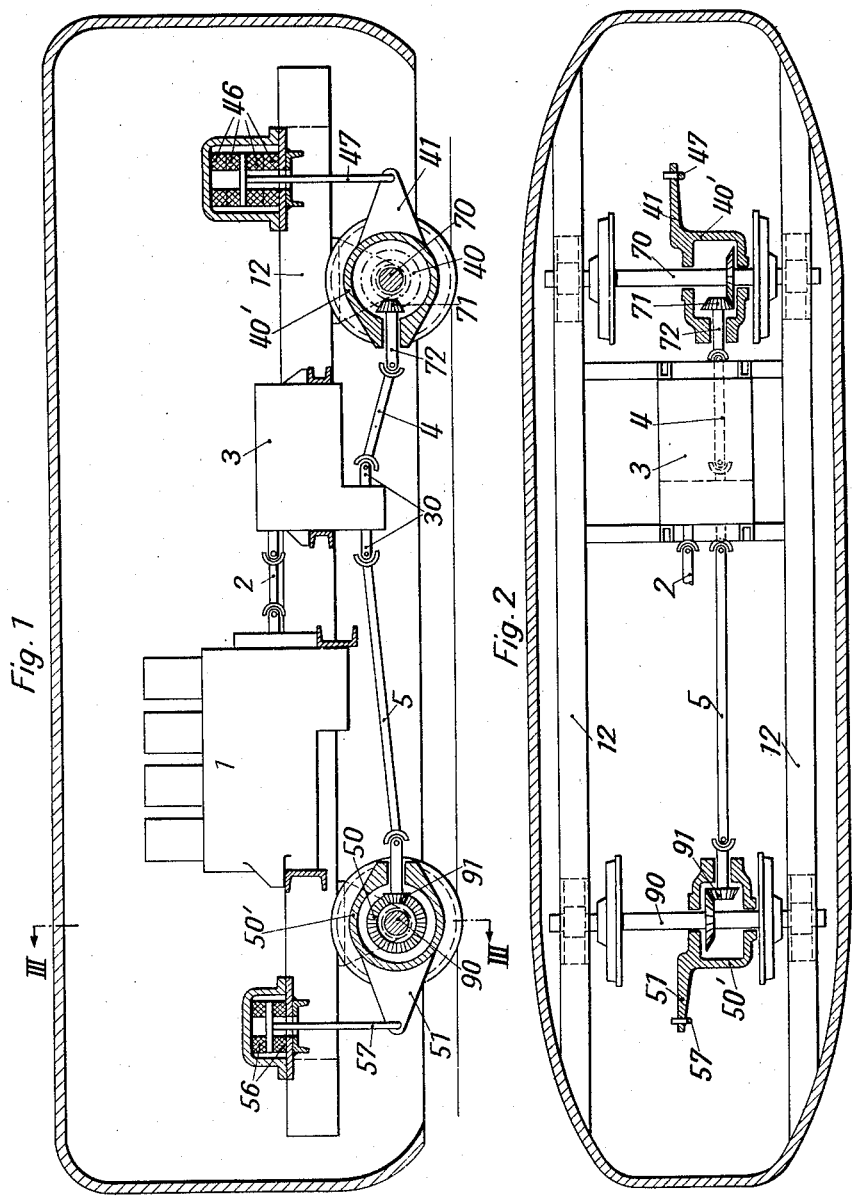
INVENTOR.
Karl Hanselmann
BY Sept. 8, 1959  K. HANSELMANN  2,902,946
POWER TRANSMITTING ARRANGEMENT IN A LOCOMOTIVE
Filed Oct. 25, 1954  4 Sheets-Sheet 2

INVENTOR.
Karl Hanselmann
BY
Patent Agent

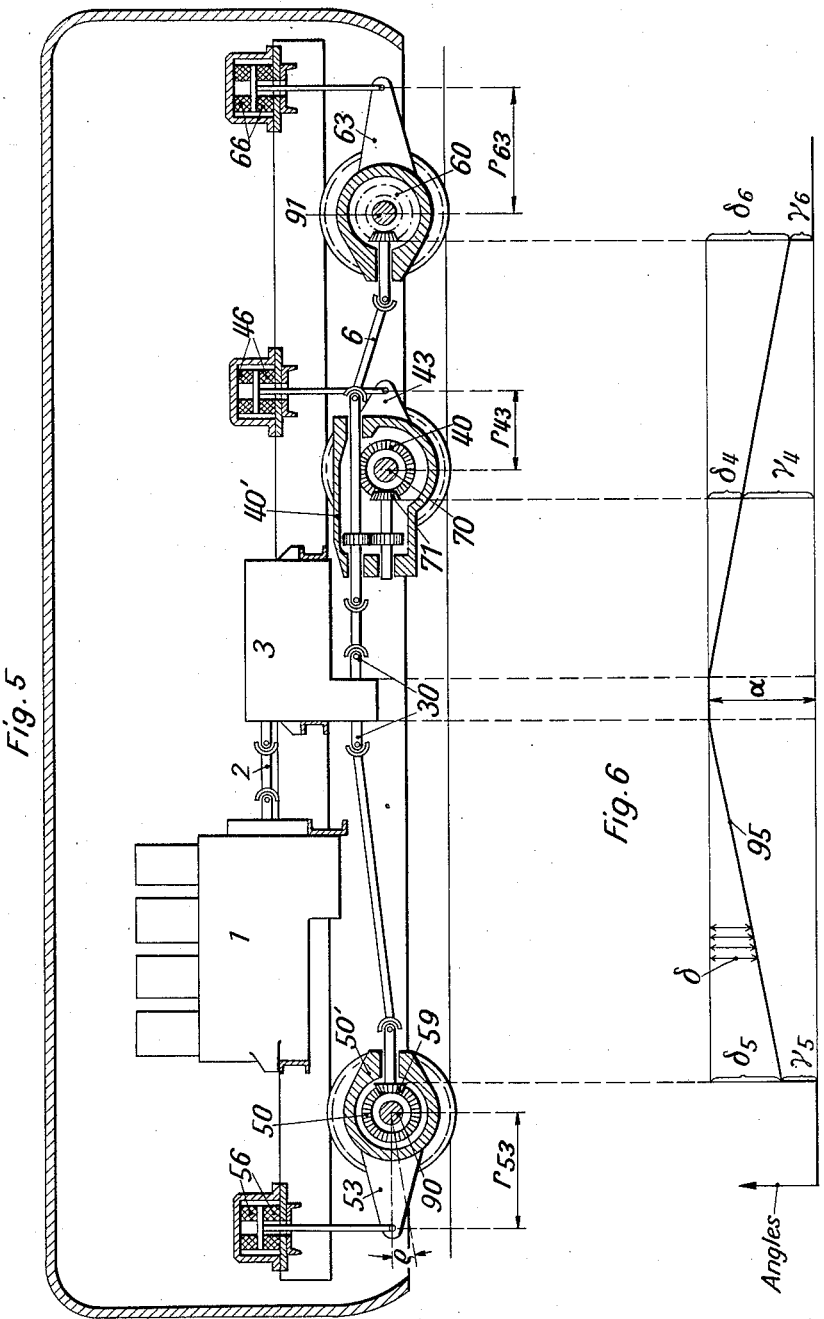

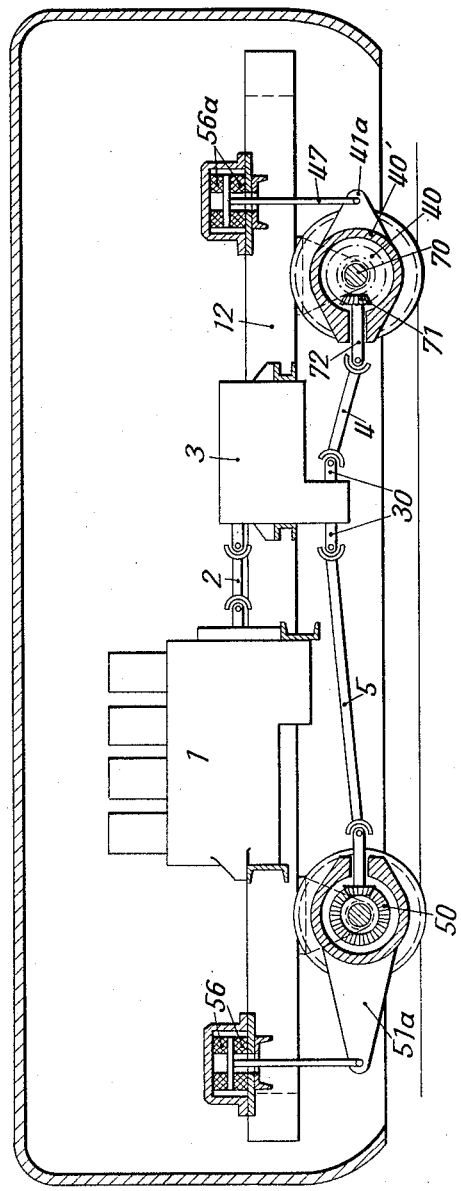

United States Patent Office
2,902,946
Patented Sept. 8, 1959

2,902,946

POWER TRANSMITTING ARRANGEMENT
IN A LOCOMOTIVE

Karl Hanselmann, Heidenheim (Brenz), Germany, assignor to J. M. Voith G.m.b.H., Maschinenfabrik, Heidenheim (Brenz), Germany Application October 25, 1954, Serial No. 464,549

Claims priority, application Germany October 30, 1953

9 Claims. (Cl. 105—62)

The present invention relates to power transmission arrangements, and, more particularly, concerns the torque support for a power transmission arrangement having a plurality of axle drives.

Since with a rail motor vehicle customarily only one-fifth of the friction weight can be made use of for the transmission of the pulling force between wheel and rail, it is the common practice, for obtaining the required power at the draw bar, to provide generally a plurality of sets of drive wheels which are coupled to each other by links or shafts. The turning movement of these drive wheels is, however, in spite of the said coupling arrangement not of uniform size when during the power transmission by means of links and connecting shafts of non-uniform length, especially when during the starting, the axle drives have different torsion angles. The differences may even reach such a magnitude that they will lead to considerable disturbances and may even cause the Cardan shafts to break.

The arrangement of the engine layout in a rail motor vehicle frequently requires a different length of the driving shafts leading to the axle drives, i.e. a longer and a shorter universal joint shaft or drive shaft. In spite of dimensioning the cross section in an appropriate manner, the long shaft will with regard to the common output shaft of the power drive transmission or distributor gear system frequently show a greater torsion angle at the axle drive than the shorter shaft. Consequently the longer universal joint shaft or drive shaft will become effective only after the angular difference has been overcome, in other words the long shaft will become effective only after the short shaft has become effective. In addition thereto, the power transmission is influenced and, more specifically is retarded by the fact that the casings of the axle gears are resiliently supported by the frame of the vehicle or by the frame of the bogies, while the movement of the support taking up the reaction forces brings about an angular displacement of the axle gear casing as a result of the rolling movement of the bevel gear pinion on the axle drive bevel wheel.

Similar to street vehicles, also rail vehicles have been equipped with mechanical or hydraulic differential gear systems or similar means in the power transmission preceding the individual axle drives in order, for instance, to compensate for the different rolling distances of the wheel rims on the rail and the different rotative movements of the coupled axle drives, which movements are caused by the different tensioning of the shafts, to thereby obtain a better distribution of the driving force. However, these arrangements and also the above mentioned elastic support do not yield a proper compensation for the angular differences in the axle drives.

It is, therefore, an object of the present invention to provide a torque support for a power transmission which will overcome the above mentioned drawbacks.

It is another object of this invention to provide a torque support for a power transmission, especially for rail vehicles, which will compensate for the difference in the rotational movement of axle drives coupled to each other.

It is still another object of this invention to provide a power transmitting arrangement, as set forth in the preceding paragraph, in which the angle of deflection of the torque supports for the axle drives will be employed for compensating for the difference in the torsion angle of the connecting shafts.

These and other objects and advantages of the invention will appear more clearly from the following specification in connection with the accompanying drawings, in which:

Fig. 1 diagrammatically illustrates a longitudinal section through a motor locomotive provided with a power transmission arrangement for two driving axles in conformity with the present invention, the torque supports having equally long levers but being provided with rubber springs of different elasticity.

Fig. 2 represents a top view of Fig. 1, some parts of Fig. 1 being omitted.

Fig. 5 shows a longitudinal section through a rail vehicle with a power transmission arrangement for three drive axles, the torque supports being equipped with levers of different lengths.

Fig. 6 illustrates by way of a graph the retarding angles of the driving shafts of the rail vehicle of Fig. 5.

Fig. 7 is a longitudinal section through a two-axle rail vehicle with lever arms of different lengths but with springs of the same characteristics.

General arrangement

Figure 3:
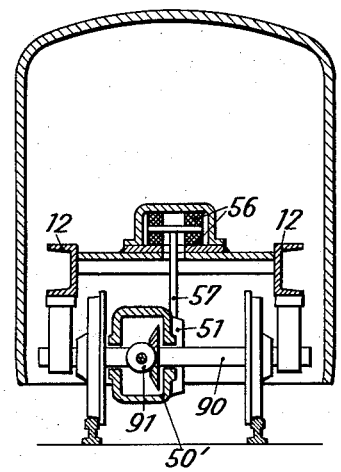
Fig. 3 is a transverse section of Fig. 1 taken along the line III—III thereof.

According to the present invention, with a power transmitting device, especially for rail vehicles, which similar to most heretofore known devices of this type has not been provided with a compensating transmission preceding the axle drives, the difference in the rotational movement of the axle drives coupled to each other is compensated for by employing the angle of deflection of the torque supports of the axle drives for compensating the difference in the torsion angles of the power transmitting shafts. To this end, the axle drives have respectively associated therewith lever systems cooperating with spring means and with the power transmitting shafts, and the lever systems are so designed and the elasticity of the spring means cooperating therewith is so selected that the total elasticity resulting from the elasticity of said spring means and from the torsional angle of the respective associated transmission shaft is approximately the same at all driving axles.

If the lengths of the lever arms of all torque supports are accurate, the spring means between which the free ends of the lever systems of the torque supports are journalled will have to be dimensioned at the approximate inverse ratio to the angular difference of the shaft ends, i.e. in such a manner that the elasticity of the spring means together with the torsion elasticity of the respective transmission shaft will be of the same magnitude for all driving axles coupled to each other. Thus, the transmission shaft with the greater angle of deflection will have associated therewith a torque support with harder or less deflection, i.e. with smaller angle of deflection, whereas the other driving axle coupled thereto and having a smaller torsion angle of the respective transmission shaft will have its torque support provided with a softer greater deflection, i.e. with a greater angle of deflection.

When employing springs of the same characteristic, the lever arms of the torque supports are so designed and the elasticity of the springs is so selected that the total elasticity resulting from the elasticity of said springs and from the torsional angle of the associated transmission shaft is approximately the same at all driving axles.

The compensation may also be effected in such a manner that the lever arms of all torque supports while being of different lengths are connected to each other by link means respectively operatively connected to spring means common to all torque supports. Also in this instance, the lever arms are so designed and the elasticity of the springs is so selected that the total elasticity resulting from the elasticity of said springs and from the torsional angle of the respective associated transmission shaft is approximately the same at all driving axles.

*Structural arrangement*

Referring now to the drawings in which similar parts are designated with the same reference numerals in Figs. 1 to 5 and 7, the driving motor 1 is connected by means of a connecting link 2 with a torque converter and reversing gear 3 of any desired type. The output shaft 30 of said torque converter and reversing gear 3 has coupled thereto the connecting shafts 4 and 5. The short connecting shaft 4 leads to the axle gear 40 the casing 40' of which is tiltably journalled on the drive shaft 70. The reaction force occurring at the bevel gear 71 during driving operation is conveyed to the casing 40' through the bearing for the shaft section 72. This reaction force tends to turn the casing 40' about the drive shaft 70. For purposes of elastically limiting this turning or torsion movement, there is provided a torque support which consists of a lever 41 (42, 43) connected to said casing 40', and of the connecting rod 47 and springs 46 (46a). The springs 46 (46a) rest on the vehicle frame 12. The long connecting shaft 5 leads in corresponding manner to the axle gear 50 with torque support 51 (or 52, 53), connecting rod 57 and supporting spring 56.

With specific reference to Figs. 1 to 3, the torque supports 41 and 51 have substantially equal lever arms, however, the rubber spring 46 is softer than the rubber spring 56 because the long connecting shaft 5 has a greater torsional angle than the short shaft 4, while the differential amount is to be compensated for by the greater deflection of the soft spring. In compensating for the differential elasticity of both shafts, the longer shaft 5 with the greater torsional angle will have associated therewith a torque support 51 with harder spring suspension, i.e. with an angular deflection which is smaller than that of the short connecting shaft 4 with smaller deflection.

Figure 4:
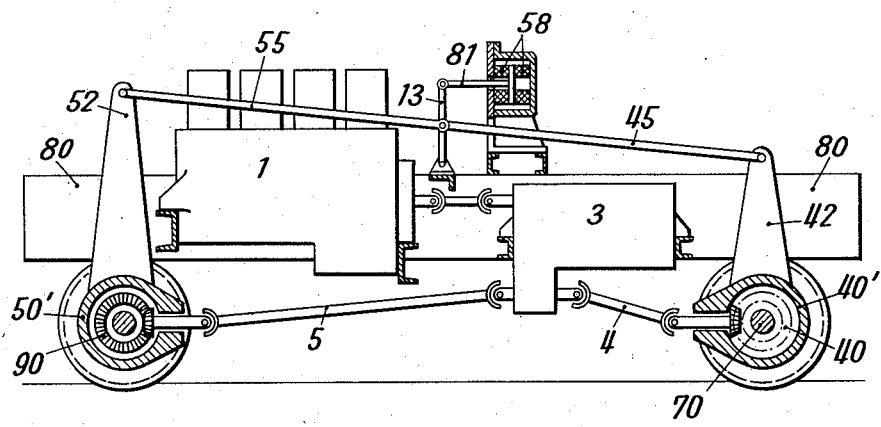
Fig. 4 illustrates a longitudinal section through a drive bogie of a rail vehicle the power transmission arrangement of which is designed according to a further embodiment of the invention.

With reference to Fig. 4 showing a longitudinal section through a modified drive bogie of a rail vehicle, both axles 70 and 90 of the bogie are driven by the engine 1, for instance an internal combustion engine, through the main drive 3 and the universal joint shafts 4 and 5 respectively. The long universal joint or Cardan shaft 5 has associated therewith a torque support with a long lever 52, whereas the short universal joint or Cardan shaft 4 has associated therewith a torque support with a short lever 42. Both levers 52 and 42 are linked together by means of rods 55 and 45. In addition thereto, these rods are linked to a lever 13 which in its turn is linked to a rod 81 connected to a spring 58 supported by the bogie frame 80.

During driving operation, the casings 40', 50' and thus also the levers 42, 52 are by the reaction forces of the bevel gears tilted in the same direction, for instance in clockwise direction. Due to the fact that during such tilting movement the ends of the levers 42, 52 have to perform strokes of the same length in view of the rod connection 45, 55, it will be clear that the long lever 52 and consequently also the casing 50' pertaining thereto always move through a smaller angle than does the short lever 42 and the casing 40'. In view of the small tilting angle of the casing 50', the drive of the axle 90 is delayed by a small angle only, whereas in view of the large tilting angle of the casing 40', the drive of the axle 70 is delayed by a large angle. The length of the levers 42, 52 is so dimensioned that the sum of all angular delays acting upon the axle 90, in other words the small angular delay produced by the torque support 52 plus the large angular delay brought about by the torsion of the drive shaft 5 are substantially equal to the sum of all angular delays acting upon the axle 70, i.e. the large angular delay caused by the torque support 42 plus the small angular delay produced by the short connecting shaft 4.

With the further embodiment of the invention shown in Fig. 5 in connection with a self-propelled rail car having three driven axles 70, 90 and 91, the said drive axles are driven through connecting shafts 4 and 5 or 4 and 6 of different lengths. The torque supports of the three drive axles are so designed that all rubber springs 46, 56 and 66 equal each other, i.e. have the same spring characteristic. Furthermore, the axle drive 60 with the longest connecting shaft 4, 6 is provided with a long lever 63, whereas the axle drive 40 with the shortest connecting shaft 4 is provided with a short lever 43. The axle drive 50 with the connecting shaft 5 of intermediate length comprises a lever 53 likewise of intermediate length. Assuming that a uniform torque acts upon all axle drives, the angular delay caused by the torque support having the shortest lever 43 will be largest, whereas the angular delay produced by the torque support with the longest lever 63 will be shortest.

The action or effect of the torque support according to the present invention will best be understood from the graph of Fig. 6 illustrating the action of the torque supports of Fig. 5. Below the respective connecting shafts 4, 5 and 6 of Fig. 5, there are plotted in Fig. 6 as ordinates the angles of delay pertaining to the connecting shafts 4, 5 and 6. It may be assumed that when starting the vehicle, the drive shaft 30 of the main transmission 3 is by means of a certain torque turned by an angle $\alpha$. Due to the elastic torsion of the connecting shaft 5, the torsion angle conveyed by the connecting shaft 5 decreases according to the graph 95 in a substantially linear manner. The total torsion angle at the left-hand end of shaft 5 is designated with the letter $\delta_5$. In other words the bevel gear 59 rotates by an angle $\alpha - \delta_5$. Due to the elastic torque support, no rotation is yet transferred to the drive shaft 90, but the bevel gear 59 first rolls on the axle drive bevel wheel 50 by an angle $\gamma_5$, for instance upwardly while the casing 50' of the axle drive and the lever 53 rotate by the angle $\rho$. The torque support exerted in this way by the spring 56 through lever 53 upon the casing 50' balances the reaction torque caused by the driving torque and acting upon the bevel gear 59. Up to this point, the drive shaft 90 has still remained at rest, the torsion angle $\alpha = \delta_5$ plus $\gamma_5$ has thus been absorbed by the torsion elasticity of the connecting shaft 5 and by the springiness of the torque support. Only when the main drive shaft 30 is turned by an angle in excess of the angle $\alpha$, will the drive axle 90 also rotate.

Correspondingly similar conditions prevail at the connecting shafts, axle drives and torque supports of the other drive axles 70 and 91. Due to the different lengths of the connecting shafts 4, 5 and 6, the torsion angles thereof $\delta_4$, $\delta_5$ and $\delta_6$ will likewise be of different magnitude. The lengths of the levers 43, 53, and 63 of the torque supports are so dimensioned that the resulting angular delays $\gamma_4$, $\gamma_5$ and $\gamma_6$ compensate for the differences of the different torsion angles $\delta_4$, $\delta_5$ and $\delta_6$, i.e. this also means that in this instance $\delta_4$ plus $\gamma_4 = \delta_5$ plus $\gamma_5 = \delta_6$ plus $\gamma_6$. In other words the total sum of the torsion elasticity of the connecting shaft and of the elasticity of the torque supports is of the same magnitude with all driving axles. In these circumstances, when starting, the driving forces are always simultaneously and uniformly conveyed to all driving axles.

With regard to Fig. 7, the arrangement shown therein corresponds essentially to that of Fig. 1 with the exception that the springs 46 of Fig. 1 have been replaced by springs 56a having the same characteristics as the springs 56. In other words, while the arrangement of Fig. 1 has springs of different characteristics, the arrangement of Fig. 7 has springs of the same characteristics. Furthermore, while in the arrangement of Fig. 1 the levers 51 and 41 have the same length, in the arrangement of Fig. 7 the lever arms 51a and 41a are of different length.

It is, of course, understood that the present invention is, by no means, limited to the particular arrangement shown in the drawings but also comprises any modifications within the scope of the appended claims.

What I claim is:

1. In combination in a vehicle having at least a first driving axle and a second driving axle: a drive motor, transmission means drivingly connected to said motor and common to said driving axles, first power transmitting shaft means arranged for conveying driving power from said transmission means to said first axle, second power transmitting shaft means arranged for conveying driving power from said transmission means to said second axle, said first power transmitting shaft means differing in length from said second power transmitting shaft means, first gear means drivingly connecting said first power transmitting shaft means with said first axle, second gear means drivingly connecting said second power transmitting shaft means with said second axle, first lever means tiltable about said first axle and including first bearing means for an element of said first gear means, said first bearing means being fixedly connected to said first lever means and being tiltable within certain limits by the torque exerted upon said element, second lever means tiltable about said second axle and including second bearing means for an element of said second gear means, said last mentioned element being fixedly connected to said second lever means and being tiltable within a certain range by the torque exerted upon said last mentioned element, and spring means operatively connected to said first and second lever means, the total elasticity resulting from the elasticity of said spring means and from the torsional angle of said first power transmitting shaft means approximately equaling the total elasticity resulting from the elasticity of said spring means and from the torsional angle of the second transmission shaft means.

2. An arrangement according to claim 1, in which said spring means include molded rubber bodies.

3. In combination in a vehicle having at least a first driving axle and a second driving axle: a drive motor, transmission means drivingly connected to said motor and common to said driving axles, first power transmitting shaft means arranged for conveying driving power from said transmission means to said first axle, second power transmitting shaft means arranged for conveying driving power from said transmission means to said second axle, said first power transmitting shaft means differing in length from said second power transmitting shaft means, first gear means drivingly connecting said first power transmitting shaft means with said first axle, second gear means drivingly connecting said second power transmitting shaft means with said second axle, first lever means tiltable about said first axle and including first bearing means for an element of said first gear means, said first bearing means being fixedly connected to said first lever means and being tiltable within certain limits by the torque exerted upon said element, second lever means having substantially the same length as said first lever means, said second lever means being tiltable about said second axle and including second bearing means for an element of said second gear means, said last mentioned element being fixedly connected to said second lever means and being tiltable within a certain range by the torque exerted upon said last mentioned element, and first and second spring means respectively having different spring characteristics and respectively being operatively connected to said first and second lever means, the total elasticity resulting from the elasticity of said first spring means and from the torsional angle of said first power transmitting shaft means approximately equaling the total elasticity resulting from the elasticity of said second spring means and from the torsional angle of the second transmission shaft means.

4. In combination in a vehicle having at least a first driving axle and a second driving axle: a drive motor, transmission means drivingly connected to said motor and common to said driving axles, first power transmitting shaft means arranged for conveying driving power from said transmission means to said first axle, second power transmitting shaft means arranged for conveying driving power from said transmission means to said second axle, said first power transmitting shaft means differing in length from said second power transmitting shaft means, first gear means drivingly connecting said first power transmitting shaft means with said first axle, second gear means drivingly connecting said second power transmitting shaft means with said second axle, first lever means tiltable about said first axle and including first bearing means for an element of said first gear means, said first bearing means being fixedly connected to said first lever means and being tiltable within certain limits by the torque exerted upon said element, second lever means having substantially the same length as said first lever means, said second lever means being tiltable about said second axle and including second bearing means for an element of said second gear means, said last mentioned element being fixedly connected to said second lever means and being tiltable within a certain range by the torque exerted upon said last mentioned element, and first and second spring means respectively operatively connected to said first and second lever means, the yieldability of said first and second spring means being substantially inverse proportional to the torsional angles of the respective first and second power transmitting shaft means.

5. In combination in a vehicle having at least a first driving axle and a second driving axle: a drive motor, transmission means drivingly connected to said motor and common to said driving axles, first power transmitting shaft means arranged for conveying driving power from said transmission means to said first axle, second power transmitting shaft means arranged for conveying driving power from said transmission means to said second axle, said first power transmitting shaft means differing in length from said second power transmitting shaft means, first gear means drivingly connecting said first power transmitting shaft means with said first axle, second gear means drivingly connecting said second power transmitting shaft means with said second axle, first lever means tiltable about said first axle and including first bearing means for an element of said first gear means, said first bearing means being fixedly connected to said first lever means and being tiltable within certain limits by the torque exerted upon said element, second lever means varying in effective length from said first lever means, said second lever means being tiltable about said second axle and including second bearing means for an element of said second gear means, said last mentioned element being fixedly connected to said second lever means and being tiltable within a certain range by the torque exerted upon said last mentioned element, and first and second spring means having substantially the same spring characteristics and being respectively operatively connected to said first and second lever means, the total elasticity resulting from the elasticity of said first spring means and from the torsional angle of said first power transmitting shaft means approximately equaling the total elasticity resulting from the elasticity of said second spring means and from the torsional angle of the second transmission shaft means.

6. In combination in a vehicle having at least a first driving axle and a second driving axle: a drive motor, transmission means drivingly connected to said motor and common to said driving axles, first power transmitting shaft means arranged for conveying driving power from said transmission means to said first axle, second power transmitting shaft means arranged for conveying driving power from said transmission means to said second axle, said first power transmitting shaft means differing in length from said second power transmitting shaft means, first gear means drivingly connecting said first power transmitting shaft means with said first axle, second gear means drivingly connecting said second power transmitting shaft means with said second axle, first lever means tiltable about said first axle and including first bearing means for an element of said first gear means, said first bearing means being fixedly connected to said first lever means and being tiltable within certain limits by the torque exerted upon said element, second lever means tiltable about said second axle and including second bearing means for an element of said second gear means, said last mentioned element being fixedly connected to said second lever means and being tiltable within a certain range by the torque exerted upon said last mentioned element, link means interconnecting said first and second lever means, and spring means common to said first and second lever means and operatively connected thereto, the total elasticity resulting from the elasticity of said spring means and from the torsional angle of said first power transmitting shaft means approximately equaling the total elasticity resulting from the elasticity of said spring means and from the torsional angle of the second transmission shaft means.

7. In combination in a vehicle having at least two driving axles each of which has connected thereto a pair of driving wheels: a drive motor carried by said vehicle, transmission means drivingly connected to said drive motor and common to said axles, a first power transmission shaft and a second power transmission shaft respectively arranged for conveying driving power from said transmission means to said axles, said two power transmission shafts differing from each other in length, a first gear set and a second gear set respectively drivingly connecting said power transmission shafts with said axles, said first gear set including a first gear connected to said first transmission shaft and also including a second gear connected to the respective adjacent driving axle and in driving engagement with said first gear, said second gear set including a third gear connected to said second transmission shaft and also including a fourth gear connected to the adjacent driving axle and arranged in driving engagement with said third gear, a pair of lever systems including means respectively supporting said first gear and said third gear and being tiltable about the respective adjacent driving axles within certain limits, and yieldable resilient means operatively connected to said lever systems to yield in response to a tilting movement of said lever systems and to exert a tilting movement thereon, the elasticity resulting from the torsional angle of said first transmission shaft and the elasticity of the lever system pertaining thereto in cooperation with said yieldable resilient means being approximately the same as the elasticity resulting from the torsional angle of said second transmission shaft and the elasticity of the lever system pertaining thereto in cooperation with said spring means.

8. In combination in a vehicle having a plurality of driving axles: a drive motor carried by said vehicle, transmission means drivingly connected to said motor and common to said driving axles, a plurality of power transmitting shafts of different lengths respectively arranged for conveying power from said transmission means to said driving axles, each of said power transmitting shafts carrying gear means drivingly connected with the respective adjacent driving axle, a plurality of torque supports respectively associated with said driving axles, each of said torque supports including bearing means tiltable about the respective adjacent driving axle and supporting that end portion of the adjacent power transmitting shaft which carries said respective gear means, each of said torque supports also including lever means connected to the respective adjacent bearing means, said lever means differing from each other in their effective length in conformity with the different lengths of said transmission shafts, and a plurality of spring means having substantially the same spring characteristics, each of said spring means being operatively connected to one but a different one of said lever means.

9. In combination in a vehicle having a plurality of driving axles: a drive motor common to said driving axles, transmission means drivingly connected to said drive motor, a plurality of power transmission shaft means arranged for respectively conveying driving power from said transmission means to said driving axles, the arrangement being such that at least the power transmission shaft means drivingly connected to one of said driving axles are of greater length than the power transmission shaft means drivingly connected to another of said driving axles; each of said driving axles having a pair of driving wheels and a gear set including a first gear respectively connected to the adjacent one of said power transmission shaft means and including a second gear connected to the respective driving axle; each of said gear sets having a lever system supporting the respective first gear connected to the respective adjacent power transmission shaft means; spring means acting upon one end of said lever systems; the total elasticity resulting from the torsional angle of the respective power transmission shaft means and from the respective lever system and the adjacent spring means being approximately the same at each driving axle.

References Cited in the file of this patent
UNITED STATES PATENTS

| | | |
|---|---|---|
| 2,262,710 | Lang | Nov. 11, 1941 |
| 2,766,703 | Cooke | Oct. 16, 1956 |